Patented Oct. 13, 1953

2,655,491

UNITED STATES PATENT OFFICE 2,655,491

SELF-HARDENING FURAN RESIN COMPOSITIONS USING A MIXTURE OF BENZENE SULFONYL CHLORIDE AND TRICHLOROACETIC ACID AS CATALYSTS

Alvin M. Edmunds and Lawrence F. Sonnabend, Midland, Mich., assignors to The Dow Chemical Company, Midland, Mich., a corporation of Delaware No Drawing. Application July 30, 1952, Serial No. 301,786

8 Claims. (Cl. 260—41)

This invention concerns certain furan resin compositions which harden at room temperature or thereabout to form solid bodies having good dimensional stability. It pertains especially to self-hardening plastic cements comprising a liquid furan resin together with carbon or graphite as a filler and a mixture of benzene sulfonyl chloride and trichloroacetic acid as a catalyst, or hardening agent.

It is known that furfuryl alcohol and mixtures of furfuryl alcohol with a lesser amount, by weight, of one or more co-condensible compounds such as furfuraldehyde, formaldehyde, maleic anhydride, phenol, or acetone can be reacted to obtain fairly stable liquid furan resins that can be stored and, when desired, be further reacted to obtain solid polymeric bodies which have good tensile strength, good impact strength, and good resistance to chemical attack by acids or alkalies. However, the known methods for making the solid resins involve difficulties and the solid resin products have possessed certain shortcomings. The initial polymerization of such starting materials to obtain the intermediate liquid resins is readily accomplished in the presence of known catalysts, e. g. strongly acidic substances such as hydrochloric acid, sulfuric acid, benzene sulfonic acid, or toluene sulfonic acid, etc. British Patent 595,208 teaches that employment of a strongly acidic catalyst in amount sufficient to cause complete polymerization of the starting material results in occurrence of an excessively rapid reaction so that the resin does not remain in moldable form for sufficient time to permit working, e. g. shaping, of the mass. On the other hand, said patent teaches that use of a weakly acidic catalyst throughout the polymerization does not result in a solid polymeric body which is fully cured. Accordingly, the initial polymerization to form the intermediate liquid furan resins is usually carried out in the presence of a small amount of a strongly acidic catalyst and the reaction is interrupted by neutralizing the catalyst when the mixture is polymerized to a point at which it has a desired viscosity. The liquid furan resins are quite stable in the absence of catalysts, but may be further polymerized in the presence of suitable catalysts to obtain solid bodies. Among the various catalysts which have been used for the final polymerization are the aforementioned strongly acidic substances, and paratoluene sulfonyl chloride, and paratoluene sulfonic acid.

The step of solidifying the liquid furan resins, as commonly practiced, is troublesome in a number of respects and the hardened resins tend to develop shrinkage cracks on standing. In some instances, the liquid resins develop a viscous outer layer, e. g. a crust or skin, in from 5 to 15 minutes after being treated with a catalyst and exposed to air, and the skin renders it difficult to shape the material or to apply it with a good bond to a base member such as brick. Also, certain of the catalysts commonly used for solidifying the liquid resins, such as aromatic sulfonic acids or aromatic sulfonyl chlorides, cause rapid hardening so that there is not sufficient time for shaping or applying the composition. More important, the solid furan resins, as usually prepared, undergo a considerable shrinkage, usually in the order of 0.8 per cent or more of their original length, on standing for one year after being hardened. As a result, the hardened bodies often develop shrinkage cracks on standing, e. g. for a month or longer, when used as mortar for the cementing together of bricks or tile.

The above-mentioned liquid furan resins have heretofore been admixed with fillers, such as sand or carbon, and a catalyst, and the cements thus prepared have been employed as mortar, e. g. for tile or brick used in lining chemical storage tanks. However, the frequent formation of a skin, or hardened exposed layer, in such plastic cement shortly after forming the same, the fact that the cements have often hardened rapidly, and that the hardened cements undergo considerable shrinkage and often develop cracks, has limited the use of such cements.

It is an object of this invention to provide liquid, or plastic, self-hardening furan resin compositions which are substantially free from the aforementioned difficulties or objectionable characteristics. A further object is to provide liquid, or plastic, furan resin compositions which solidify and harden on standing at room temperature or thereabout; which remain plastic for one hour or longer after being formed and thus permit ample time for shaping or applying the same; have little or no tendency to develop a viscous skin or layer at the exposed surface during standing in plastic condition; and which undergo less shrinkage and have less tendency to develop cracks when used as mortar for bonding bricks together than is usual with other hardened furan resins. A particular object is to provide self-hardening, plastic cements having the desirable properties just stated, which cements comprise a liquid furan resin; carbon, graphite or a mixture thereof as a filler; and a mixture of benzene sulfonyl chloride and trichloroacetic acid as a catalyst for causing solidification and hardening of the cement. Other objects will be evident from the following description of the invention.

We have found that mixtures of from 20 to 60 per cent by weight of trichloroacetic acid and of from 80 to 40 per cent of benzene sulfonyl chloride are highly effective as catalysts for causing the solidification and hardening of the aforementioned liquid furan resins at room temperature and that these catalyst mixtures differ from their individual ingredients and also from most catalysts previously known for the hardening of furan resins in several important respects. The catalyst mixtures just mentioned exhibit a delay action, usually of from 1 to 4 hours at room temperature, after being admixed with a liquid furan resin, or a composition comprising such resin, before causing solidification of the resin. Accordingly, there is ample time for shaping, or otherwise working or applying, the resin or compositions comprising such catalyst mixtures before solidification occurs. However, once the solidification reaction starts, the catalyst mixtures of the invention are highly effective in causing substantially complete polymerization in from 8 to 16 hours to form a hardened body which undergoes less shrinkage on standing and has far less tendency to develop shrinkage cracks than is usual with furan resin compositions which have been solidified with other catalysts heretofore used for the purpose. The individual ingredients of the catalyst mixtures of the invention, i. e. benzene sulfonyl chloride or trichloroacetic acid, do not possess such desirable characteristics. Instead, they each harden a furan resin composition to form a solid body which undergoes more extensive shrinkage after becoming hardened than is obtained when similarly employing the catalyst mixtures of the invention.

The aforementioned catalytic mixtures of benzene sulfonyl chloride and trichloroacetic acid also have a desirable property, when added to a liquid furan resin, of causing substantially uniform solidification and hardening of the entire body of resin without first forming a skin or crust at the surface of the composition. This avoidance of skin formation facilitates use of the compositions, e. g. in making molded articles, or in coating solid bodies, etc.

We have further found that by admixing with the liquid furan resin, powdered carbon, or powdered graphite, or a mixture of carbon and graphite, and benzene sulfonyl chloride and trichloroacetic acid in the aforestated relative proportions, there are obtained cements which remain plastic for a considerable time, e. g. from 1 to 4 hours, and then solidify and harden in from 8 to 16 hours, at room temperature with formation of solid bodies having good dimensional stability. The linear shrinkage which the hardened cements of the invention undergo on standing for 1 year at room temperature does not exceed 0.6 per cent and usually is in the order of from 0.3 to 0.4 per cent. Such cements can be used to form laminated tank linings which do not develop cracks on standing, or they can be used as mortar for laying bricks or tile. The cements form a strong bond with bricks or tile, and are themselves strong and resistant to breakage. They are also resistant to chemical attack by acids, alkalies, and organic liquids such as benzene, toluene, carbon tetrachloride or acetone, etc. Accordingly, the cements are useful in lining vessels which are to contain acids, alkalies, or solvents. The invention pertains especially to such cements, but is not limited to them.

Any of the aforementioned liquid furan resins prepared from reactive starting material containing at least 50 per cent by weight of furfuryl alcohol can be used as the resin ingredient of the compositions of the invention. A considerable number of such liquid furan resins are known and some of them are commercially available. Examples of such materials are the liquid polymers of furfuryl alcohol, the liquid copolymers of furfuryl alcohol and lesser amounts, by weight, of furfuraldehyde; liquid polymers prepared from solutions of resins such as polyvinyl butyral in a larger amount by weight of furfuryl alcohol; liquid polymers of mixtures of a major amount of furfuryl alcohol and a minor amount of formaldehyde; liquid polymers of mixtures of a major amount by weight of furfuryl alcohol and minor amounts of furfuraldehyde and phenol; and liquid polymers of mixtures of a major amount by weight of furfuryl alcohol and minor amounts of furfuraldehyde and acetone; etc. Such liquid furan resins, prepared from furfuryl alcohol as a principal starting material, are also known as "furfuryl alcohol resins."

Any of such liquid furan resins can be further polymerized to solidify and harden the same by mixing therewith minor amounts of benzene sulfonyl chloride and trichloroacetic acid in the aforementioned relative proportions. The benzene sulfonyl chloride and trichloroacetic acid may be added individually, or be premixed and added together. The catalyst mixture is usually employed in amount corresponding to from 10 to 25 per cent of the weight of the liquid furan resin which is to be solidified, but it may be used in smaller or larger amounts, e. g. in proportions corresponding to from 7 to 45 per cent of the weight of the resin liquid. Although any mixture of from 20 to 60 per cent by weight of trichloroacetic acid and from 80 to 40 per cent benzene sulfonyl chloride is effective as a catalyst for hardening the resins to obtain solid bodies having good dimensional stability, a saturated solution of trichloroacetic acid in benzene sulfonyl chloride is readily prepared, is highly effective for the purpose, and is generally preferred. At room temperature, the saturated solution contains about 47.2 per cent by weight of trichloroacetic acid and about 52.8 per cent of benzene sulfonyl chloride.

As hereinbefore mentioned, the catalyst mixtures of benzene sulfonyl chloride and trichloroacetic acid exhibit a delayed action which permits time for shaping or applying the resin compositions comprising the same. However, the reaction for solidification of the furan resins is exothermic and, once it starts, the catalytic mixtures of the invention cause it to occur quite rapidly. When the catalysts of the invention are added to a pint or more of an undiluted liquid furan resin, an extremely vigorous reaction sometimes occurs after the mixture has stood, e. g. for from 30 minutes to 3 hours or thereabout. Occurrence of a violent reaction can be avoided either by spreading the catalyzed resin composition as a thin film so that heat generated by the reaction may rapidly be dissipated, or by admixing inert solids such as sand, pebbles, or powdered graphite, etc. with the liquid furan resins. The amount of solid inert material required to avoid occurrence of an excessively rapid reaction varies with changes in the kind and quantity of liquid furan resin employed and the kind of solid material used as a diluent, or filler. Usually, we employ 50 per cent by weight or more, preferably from 47 to 62 per cent, of a finely divided solid, based on the combined weight of the same and the liquid furan resin, but the diluent can be used in smaller or larger proportions, or it can be omitted. Thus, by admixing the liquid furan resin, benzene sulfonyl chloride, trichloroacetic acid, and if desired an inert liquid solvent for the resin such as acetone, benzene, toluene, and xylene, etc., in the aforestated preferred proportions, there is obtained a liquid coating composition which, when spread on solid surfaces, e. g. of wood, concrete, paper, ceramics, or metals, dries and hardens within a few hours. Other usual ingredients such as dyes, pigments, or plasticizers, may be added to the compositions of the invention. The compositions should be used within a short time, e. g. 1 to 3 hours or thereabout, after adding the benzene sulfonyl chloride and trichloroacetic acid.

The invention pertains especially to self-hardening cements prepared as just described, except that an inert finely divided solid, preferably carbon powder or powdered graphite, is used as a filler and diluent for the resin. Carbon and graphite are particularly useful as the filler, since they, as well as the hardened furan resins, are resistant to chemical attack by acids, alkalies, and solvents, i. e. by employing carbon, or graphite, or a mixture of the same as the filler there is obtained a cement which hardens to form a solid body that is resistant to acids, alkalies and solvents. However, the carbon and graphite may be replaced wholly or in part by other usual fillers such as sand, or brick chips, silica pebbles, etc. Sand and brick chips or silica pebbles are satisfactory as fillers when it is desired that the hardened cements be resistant to acids and solvents. In some instances, the cements comprising such fillers are also resistant to attack by alkalies.

The plastic cements are most conveniently prepared by admixing the trichloroacetic acid and benzene sulfonyl chloride with one or more of the aforementioned liquid furan resins and then adding and mixing in the filler, the several ingredients being used in the relative proportions hereinbefore given. However, the ingredients can be admixed in other ways. For instance, the trichloroacetic acid and benzene sulfonyl chloride can be admixed with the filler and this mixture be stored or shipped and, when desired, be admixed with the liquid furan resin to form the self-hardening plastic cement.

Although any of the aforementioned liquid furan resins, containing 50 per cent by weight or more of chemically combined furfuryl alcohol, can be used as the resin ingredients of the plastic cements, the amount of shrinkage which the freshly hardened cements undergo on standing is dependent, not only on the proportions of benzene sulfonyl chloride and trichloroacetic acid in the cements, but also, in part, on the viscosity of the liquid furan resin used as a starting material. In general, an increase in viscosity of such liquid resin starting material results in a decrease in the extent to which the hardened cement undergoes shrinkage. However, mixing of the several ingredients of the cement is sometimes difficult when using a highly viscous resin starting material. Certain of the commercially available liquid furan resins have viscosities in the order of from 15 to 350 centipoises at 25° C. They may be used directly in making the resin compositions of the invention. However, to obtain lower shrinkage they are preferably treated with a minor amount of a polymerization catalyst and thickened, by further polymerization, to a viscosity of from 500 to 4000 centipoises at 25° C. prior to being mixed with the other ingredients. Any of the catalysts used in thickening furan resins can be employed for the purpose, but the aforementioned catalytic mixtures of benzene sulfonyl chloride and trichloroacetic acid are preferably used. For such pre-thickening operation, the catalyst mixture is usually employed in amount corresponding to 2 per cent or less, e. g. from 0.3 to 2.0 per cent, of the weight of the liquid resin. Upon adding the catalyst, the liquid resin thickens at room temperature to the desired viscosity usually in from 20 to 48 hours. When it is of from 500 to 4000 centipoises viscosity at 25° C., it is mixed with the other aforementioned ingredients and a further amount of the catalyst mixture to obtain a self-hardening resin composition.

The following examples describe ways in which the invention has been practiced and illustrate certain of its advantages, but are not to be construed as limiting its scope.

EXAMPLE 1

To a mixture of 2 kilograms of furfuryl alcohol and 40 grams of paraformaldehyde, 63 grams of maleic anhydride was added portionwise in 20 minutes with stirring. The mixture was stirred and heated first at 60° C. for 2 hours, then at 75° C. for 4 hours. The mixture was then subjected to distillation under vacuum, whereby approximately 10 weight per cent of the same was removed as low boiling materials, e. g. water and unreacted furfuryl alcohol. The remaining product was a liquid furan resin having a viscosity of 660 centipoises at 25° C. A portion, i. e. 43.5 parts by weight, of the liquid resin was treated with 3.44 parts of benzene sulfonyl chloride and 3.07 parts of trichloroacetic acid and then admixed with 50 parts of powdered graphite. The plastic cement thus formed did not rapidly form a crust, or a viscous skin. Instead, it remained workable for one hour or longer and thereafter hardened throughout in a substantially uniform manner. Portions of the plastic cement were molded into test pieces which hardened on standing at room temperature in about 4 hours. A bar of the cement, having dimensions of approximately 1 inch x 1 inch x 10 inches, was accurately measured for length 24 hours after the cement was mixed and also at intervals of 1 day, 10 days, and 30 days thereafter. It was found that the bar had shrunk by 0.163 per cent of its original length in the first day; by 0.262 per cent of the original length in 10 days; and by 0.280 per cent of the original length in 30 days. From the decrease in amount of shrinkage occurring per day, it is evident that at the end of the 30 day period, the shrinkage had almost ceased. Seven days after becoming hardened, the tensile strength of one of the test pieces was determined and found to be 1510 pounds per square inch of cross section. Another of the test pieces was weighed, immersed for 30 days in a bath of an aqueous hydrochloric acid solution of 20 weight per cent concentration heated at 110° C., removed from the heated bath, washed with water, surface-dried by wiping with a cloth, reweighed, and again tested for tensile strength. It was found that the test piece weighed 1.57 per cent less than it had before being immersed in the acid and that it had a tensile strength of 595 pounds per square inch. Another of the hardened test pieces was immersed for 30 days in an aqueous sodium hydroxide solution of 10 weight per cent concentration which was at a temperature of 25° C. The test piece was then removed, washed with water, surface-dried by wiping with a cloth, reweighed, and tested for tensile strength. It weighed 1.58 per cent more than before being immersed in the alkali solution and had a tensile strength greater than 2000 pounds per square inch.

For purpose of comparison, 40 parts by weight of the same liquid furan resin was admixed with 60 parts of a mixture of 94 per cent of powdered hard-carbon and 6 per cent of a catalyst for the hardening of furan resins. The catalyst was a mixture of 80 per cent by weight benzene sulfonyl chloride and 20 per cent para-toluene sulfonic acid. The resulting plastic cement was molded into test pieces which hardened, on standing at room temperature, in about 2 hours. Seven days after becoming hardened, the tensile strength of one of the test pieces was determined and found to be only 555 pounds per square inch cross section.

EXAMPLE 2

In each of a series of experiments, one or both of the compounds, benzene sulfonyl chloride and trichloroacetic acid, were admixed with Alkor cement liquid (a commercially available liquid polyfurfuryl alcohol condensation resin) and the mixture was stirred together with powdered graphite to form a self-hardening plastic cement. The several ingredients were used in the relative proportions stated in the following table. Each cement was molded into test pieces which hardened, on standing at room temperature, in about 4 hours. The length of a hardened test bar of each cement was measured 24 hours after the cement had been prepared and also at the various times thereafter indicated in the table. The table names and gives the parts by weight of each of the starting materials. It gives the per cent by weight of each of the compounds, benzene sulfonyl chloride and trichloroacetic acid in the catalyst employed in each cement. It also gives the per cent of its original length by which a hardened bar had shrunk on standing at room temperature for the times stated in the table. In the table, benzene sulfonyl chloride is abbreviated as "PhSO₂Cl" and trichloroacetic acid is abbreviated as "Cl₃Ac."

EXAMPLE 3

In each of several experiments, a plastic cement was prepared by mixing together a liquid resin identical with that employed in Example 2, a filler, and a catalyst in the proportions given in Table II. Each cement was molded into test pieces which hardened on standing about 4 hours at room temperature. A bar of each cement was tested at intervals for shrinkage, as in Example 2. Thirty days after becoming hardened, another test piece of each cement was used in determining its tensile strength. Table II names the filler and catalyst ingredients used in each cement and gives the proportions, in parts by weight, of the several starting materials. It gives the tensile strength, in pounds per square inch, of each hardened cement and the per cent shrinkage of each cement at stated times after it had hardened. In the table, benzene sulfonyl chloride, trichloroacetic acid, and para-toluene sulfonyl chloride are abbreviated as "PhSO₂Cl," "Cl₃Ac," and "Tol-SO₂Cl," respectively.

Table II

| | Starting materials | | | | | Hardened cement | | | | |
|---|---|---|---|---|---|---|---|---|---|---|
| | | Filler | | Catalyst | | Tensile strength, lbs./sq. in. | Percent shrinkage in— | | | |
| Run No. | Liquid resin, pts. | Kind | Pts. | Kind | Pts. | | 1 day | 30 days | 90 days | 1 year |
| 1 | 39.42 | Graphite | 55 | Tol-SO₂Cl | 5.57 | 551 | 0.174 | 0.551 | 0.574 | 0.800 |
| 2 | 39.5 | do | 55 | {PhSO₂Cl / Cl₃Ac} | 3.2 / 2.37 | 1,082 | .141 | .337 | .346 | .458 |
| 3 | 33.3 | Carbon | 61.42 | Tol-SO₂Cl | 5.25 | 1,203 | .102 | .387 | .422 | .632 |
| 4 | 33.3 | do | 61.42 | {PhSO₂Cl / Cl₃Ac} | 2.21 / 3.04 | 1,057 | .150 | .294 | .307 | .413 |
| 5 | 39.16 | do | 55 | Tol-SO₂Cl | 5.84 | 1,120 | .119 | .436 | .479 | .776 |
| 6 | 39.1 | do | 55 | {PhSO₂Cl / Cl₃Ac} | 2.46 / 3.38 | 1,405 | .157 | .367 | .367 | .498 |

EXAMPLE 4

This example illustrates the effect, on the shrinkage of hardened cements of the invention, of a change in viscosity of a liquid furan resin used in preparing the cements. The resin starting material was Permanite cement liquid (a commercial liquid furan resin) which had a viscosity of 15 centipoises at 25° C. In one experiment, 3.2 parts by weight of benzene sulfonyl chloride and 2.37 parts of trichloroacetic acid were admixed with 33.33 parts of the liquid resin of 15 centipoises viscosity and into this mixture was stirred 61.1 parts of graphite powder. The resulting plastic cement was molded into test pieces which hardened on standing at room temperature in about 10 hours. The length of a test bar was measured 24 hours after it had hardened and at intervals thereafter. In another experiment, a portion of the liquid resin, having a viscosity of 15 centipoises, was treated with 1.2 per cent of its weight of a mixture of 52.8

Table 1

| | Starting materials | | | | Composition of catalyst | | Percent shrinkage on standing— | | | | | | |
|---|---|---|---|---|---|---|---|---|---|---|---|---|---|
| Run No. | Liquid resin, pts. | Graphite, pts. | PhSO₂Cl, pts. | Cl₃Ac, pts. | PhSO₂Cl, percent | Cl₃Ac, percent | 1 day | 10 days | 30 days | 60 days | 90 days | 180 days | 1 year |
| 1 | 40.1 | 55.0 | 4.9 | 0 | 100 | 0 | 0.160 | 0.410 | 0.433 | 0.435 | 0.426 | 0.436 | 0.536 |
| 2 | 39.5 | 55.0 | 3.2 | 2.37 | 57.5 | 42.5 | .141 | .313 | .337 | .346 | .346 | .375 | .458 |
| 3 | 39.1 | 55.0 | 2.46 | 3.38 | 42.2 | 57.8 | .144 | .308 | .330 | .345 | .345 | .350 | .350 |
| 4 | 38.25 | 55.0 | 0 | 6.75 | 0 | 100 | .203 | .501 | .587 | .602 | .607 | .650 | .750 | per cent by weight benzene sulfonyl chloride and 47.2 per cent trichloroacetic acid and allowed to stand at room temperature for 46 hours. The liquid resin then had a viscosity of about 4000 centipoises at 25° C. To 44.95 parts by weight of the thickened resin, there were added 3.97 parts of benzene sulfonyl chloride and 3.55 parts of trichloroacetic acid. The mixture was stirred together with 47.53 parts of graphite powder. The plastic cement thus formed had about the same "body," or ease of being shaped, as that prepared in the first experiment. The cement was molded into test pieces which hardened on standing in about 8 hours. The length of a test bar was determined when it had hardened for 24 hours and at intervals thereafter. Table III identifies each experiment by giving the viscosity in centipoises at 25° C., of the liquid resin used in making each cement. The table also gives the per cent of its original length by which a bar of each cement had shrunk at stated times after the length of the bar was first measured.

*Table III*

| Run No. | Viscosity of liquid resin, cps. at 25° C. | Percent shrinkage of bar in— | | | |
|---|---|---|---|---|---|
| | | 1 day | 5 days | 10 days | 15 days |
| 1 | 15 | 0.101 | 0.161 | 0.173 | 0.179 |
| 2 | 4,000 | .058 | .081 | .082 | .083 |

EXAMPLE 5

In each of two experiments, 13 parts by weight of a catalyst was added with stirring to 87 parts of a liquid furan resin which had been prepared as described in Example 1. The catalyst employed in one of the experiments was p-toluene sulfonyl chloride and that used in the other experiment was a solution of 52.8 per cent by weight benzene sulfonyl chloride and 47.2 per cent trichloroacetic acid. A portion of each of the resulting liquid compositions was allowed to stand in an open container and was observed from time to time. About 3⅔ hours after forming the compositions, that containing the p-toluene sulfonyl chloride had formed a viscous layer, or skin, at its surface and otherwise remained liquid, whereas the composition containing the benzene sulfonyl chloride and trichloroacetic acid was a substantially uniform liquid. The last-mentioned composition did not form a distinct skin, or crust, at any time prior to it becoming hardened and it remained sufficiently fluid to be applied as a coating composition for about 5 hours after adding the catalyst. Except for the skin, or crust, formed thereon, the composition containing the para-toluene sulfonyl chloride contained sufficiently liquid to be applied as a coating composition for about 7 hours after adding the catalyst. Each of the liquid compositions was spread as a film on a solid surface. The time required for the films to become solid was about 20½ hours for the composition containing the para-toluene sulfonyl chloride and about 6¼ hours for the composition containing the benzene sulfonyl chloride and trichloroacetic acid.

EXAMPLE 6

In one of a pair of experiments, 4.76 parts by weight of para-toluene sulfonic acid was added with stirring to 95.24 parts of Durisite cement liquid (a liquid furan resin) and a portion of the composition was promptly applied as a coating on a solid surface. Nine minutes after forming the composition, the film thereof had solidified and hardened. Four minutes after forming the composition, a portion thereof, which was in an open container, had formed a skin, or crust, at its exposed surface and was undergoing a rapid exothermic reaction for solidification of the same. In another experiment, 13 parts by weight of a solution of 52.8 weight per cent of benzene sulfonyl chloride and 47.2 per cent trichloroacetic acid was added with stirring to 87 parts of a liquid resin identical with that employed in the first experiment. A portion of the resulting composition was applied as a film on a solid surface and the remainder was allowed to stand in an open container. It remained sufficiently fluid to be applied as a coating composition for 2 or 3 hours, but formed a gel which was too thick for such purpose when it had stood for about 4 hours. Prior to becoming solidified, it did not form a distinct crust or skin. The composition became solid and hard during 8 hours of standing without occurrence of a vigorous reaction.

EXAMPLE 7

To 33.33 parts by weight of Permanite cement liquid (a liquid furan resin) having a viscosity of 46.4 centipoises at 25° C. there were added 4.27 parts of benzene sulfonyl chloride and 3.77 parts of trichloroacetic acid. The liquid mixture was stirred together with 58.66 parts of powdered graphite. The plastic cement, thus formed, was molded into test pieces which hardened on standing at room temperature in about 8 hours. A hardened bar of the cement was measured from time to time to determine its shrinkage. After standing for 30 days, another test piece was found to have a tensile strength of 1221 pounds per square inch. Other of the hardened test pieces were weighed and immersed for 30 days in the following respective baths: (a) distilled water heated at 100° C., (b) an aqueous hydrochloric acid solution of 20 weight per cent concentration heated at 110° C., and (c) an aqueous sodium hydroxide solution of 10 weight per cent concentration which was maintained at 25° C. The test pieces were then removed from the baths and those which had been immersed in acid or alkali were washed with water. Test pieces that had been immersed in the respective baths were surface-dried by wiping with a cloth, reweighed, and tested for tensile strength. Table IV gives the per cent of its original length by which a test bar of the cement shrunk on standing at room temperature for the stated periods after the bar had become hardened. The table also indicates the per cent loss or gain in weight which resulted from immersion of test pieces of the hardened cement in the above-mentioned respective baths and the tensile strength of the test pieces after removal from the baths. In the table a gain in weight is indicated by the prefix "+" and a loss in weight by the prefix "—."

Table IV

| Percent shrinkage in— | | | | | | Results of immersion in— | | | | | |
| --- | --- | --- | --- | --- | --- | --- | --- | --- | --- | --- | --- |
| | | | | | | H₂O at 100° C. | | HCl at 110° C. | | NaOH at 25° C. | |
| 1 day | 10 days | 30 days | 90 days | 180 days | 1 year | Percent wt. change | Tensile strength, lbs./sq. in | Percent wt. change | Tensile strength, lbs./sq. in. | Percent wt. change | Tensile strength, lbs./sq. in. |
| 0.120 | 0.179 | 0.199 | 0.204 | 0.249 | 0.292 | +3.57 | 917 | −0.72 | 889 | +1.21 | 1,475 |

EXAMPLE 8

A plastic cement was prepared by treating a liquid furan resin with approximately 15 per cent of its weight of a hardening agent and stirring 25 parts by weight of the resulting mixture together with 75 parts of a mixture of powdered coke, sand, and silica pebbles of from about ¼ to ½ inch diameter. The liquid furan resin was one that had been prepared as described in Example 1. The hardening agent was a mixture of 52.8 per cent by weight of benzene sulfonyl chloride and 47.2 per cent of trichloroacetic acid. The above-mentioned solids consisted of 35 per cent by weight of powdered coke, 15 per cent sand, and 50 per cent silica pebbles. Approximately 200 pounds of the plastic cement was cast as a rectangular ring, or closed band, having wires embedded therein as reinforcing. The closed band had outside dimensions, for the rectangle, of 3 feet by 4 feet. The ring, or closed band, had a depth of 5 inches and a maximum thickness, from the inner to outer surfaces thereof, of approximately 6 inches. The cement ring or band, hardened on standing at room temperature for several hours. It was used as a segment of the walls of apparatus for handling chemicals. Several days after the cement had hardened the apparatus was placed in service. It was employed under conditions such that part of the cement band was in contact with chlorine and aqueous hypochlorous acid and part of the band was in contact with an aqueous caustic soda solution of approximately 15 weight per cent concentration, which solution was heated at a temperature of 85° C. After 3 months use of the apparatus under the conditions just described, it was removed from service and the cement band was examined. The cement band was not cracked, or otherwise damaged, and did not appear to have been corroded.

We claim:

1. A composition comprising a major amount by weight of a liquid furan resin, having at least 50 per cent by weight of furfuryl alcohol chemically combined therein, and a minor amount of a mixture of from 80 to 40 per cent of benzene sulfonyl chloride and from 20 to 60 per cent of trichloroacetic acid as a hardening agent.

2. A composition, as claimed in claim 1, wherein the hardening agent is a substantially saturated solution of trichloroacetic acid in benzene sulfonyl chloride.

3. A composition, as claimed in claim 1, wherein the liquid resin is a polymer of furfuryl alcohol and the hardening agent is a substantially saturated solution of trichloroacetic acid in benzene sulfonyl chloride.

4. A plastic cement capable of hardening on standing to form a solid body that undergoes not more than 0.6 per cent of linear shrinkage in one year after becoming hardened, which cement comprises from 33 to 45 per cent by weight of a liquid furan resin from 47 to 62 per cent of at least one finely divided filler of the class consisting of carbon and graphite and from 5 to 15 per cent of a hardening agent, said liquid furan resin being one having at least 50 per cent by weight of furfuryl alcohol chemically combined therein and said hardening agent being a mixture of from 80 to 40 per cent by weight of benzene sulfonyl chloride and from 20 to 60 per cent of trichloroacetic acid.

5. A plastic cement, as claimed in claim 4, wherein the liquid furan resin is a polymer of furfuryl alcohol.

6. A plastic cement, as claimed in claim 4, wherein the hardening agent is a substantially saturated solution of trichloroacetic acid in benzene sulfonyl chloride.

7. A plastic cement, as claimed in claim 4, wherein the liquid furan resin is a condensation product of a major amount by weight of furfuryl alcohol and minor amounts of formaldehyde and maleic anhydride, and the hardening agent is a substantially saturated solution of trichloroacetic acid in benzene sulfonyl chloride.

8. A method of solidifying and hardening liquid furan resins, having at least 50 per cent by weight of furfuryl alcohol chemically combined therein, which comprises admixing with such resin a minor amount of a hardening agent consisting essentially of from 80 to 40 per cent by weight of benzene sulfonyl chloride and from 20 to 60 per cent of trichloroacetic acid.

ALVIN M. EDMUNDS.
LAWRENCE F. SONNABEND.

References Cited in the file of this patent

UNITED STATES PATENTS

| Number | Name | Date |
| --- | --- | --- |
| 2,499,275 | McWhorter | Feb. 28, 1950 |
| 2,570,077 | Dunlop | Oct. 2, 1951 |
| 2,601,497 | Brown | June 24, 1952 |